(12) United States Patent
Shen et al.

(10) Patent No.: US 10,440,390 B2
(45) Date of Patent: Oct. 8, 2019

(54) RAPID SELECTION METHOD FOR VIDEO INTRA PREDICTION MODE AND APPARATUS THEREOF

(71) Applicant: ALIBABA GROUP HOLDING LIMITED, George Town, Grand Cayman (KY)

(72) Inventors: Cao Shen, Hangzhou (CN); Haohui Xu, Hangzhou (CN); Chang Zhou, Hangzhou (CN); Kaiyan Chu, Hangzhou (CN); Guibin Lu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 79 days.

(21) Appl. No.: 15/640,328

(22) Filed: Jun. 30, 2017

(65) Prior Publication Data

US 2017/0302962 A1    Oct. 19, 2017

Related U.S. Application Data

(63) Continuation of application No. PCT/CN2015/098261, filed on Dec. 22, 2015.

(30) Foreign Application Priority Data

Dec. 31, 2014  (CN) .......................... 2014 1 0855651

(51) Int. Cl.
*G06K 9/48* (2006.01)
*H04N 19/593* (2014.01)
(Continued)

(52) U.S. Cl.
CPC ......... *H04N 19/593* (2014.11); *H04N 19/103* (2014.11); *H04N 19/11* (2014.11);
(Continued)

(58) Field of Classification Search
CPC ...... H04N 19/593; H04N 19/14; H04N 19/11; H04N 19/182; H04N 19/176; H04N 19/103
See application file for complete search history.

(56) References Cited

U.S. PATENT DOCUMENTS

| | | | |
|---|---|---|---|
| 8,422,782 B1* | 4/2013 | Dhua ................... | G06K 9/4671 382/170 |
| 2012/0134596 A1* | 5/2012 | Yamada ............... | G06K 9/3275 382/199 |

(Continued)

FOREIGN PATENT DOCUMENTS

| CN | 1795680 A | 6/2006 |
|---|---|---|
| CN | 101964906 A | 2/2011 |

(Continued)

OTHER PUBLICATIONS

First Chinese Office Action issued in Chinese Application No. 201410855651.9, dated May 18, 2018 (12 pages).

(Continued)

*Primary Examiner* — Howard D Brown, Jr.
(74) *Attorney, Agent, or Firm* — Finnegan, Henderson, Farabow, Garrett & Dunner, LLP

(57) ABSTRACT

This application discloses methods and apparatuses for intra prediction mode selection, one method comprising: acquiring a gradient amplitude and a gradient angle of each element in a prediction block; analyzing statistics on the gradient angles and generating a gradient angle histogram of the prediction block; if the texture smoothness of the prediction block is greater than a first pre-determined threshold value, determining that the prediction block is a first-type prediction block, and setting a prediction mode of the first-type prediction block to comprise a direct current prediction mode and a planar prediction mode; and if the texture smoothness of the prediction block is less than a (Continued)

second pre-determined threshold value, determining that the prediction block is a second-type prediction block, and setting an angular prediction mode of the second-type prediction block to comprise an angular prediction mode corresponding to the maximum peak value in the gradient angle histogram.

18 Claims, 6 Drawing Sheets

(51) Int. Cl.
    *H04N 19/103*     (2014.01)
    *H04N 19/176*     (2014.01)
    *H04N 19/182*     (2014.01)
    *H04N 19/11*     (2014.01)
    *H04N 19/14*     (2014.01)

(52) U.S. Cl.
    CPC ........... *H04N 19/14* (2014.11); *H04N 19/176* (2014.11); *H04N 19/182* (2014.11)

(56) References Cited

U.S. PATENT DOCUMENTS

2013/0121401 A1* 5/2013 Zheludkov ............. H04N 19/65
    375/240.02
2014/0028842 A1* 1/2014 Abramson ............. H04N 7/188
    348/143
2015/0003524 A1* 1/2015 Yamamoto ........... H04N 19/587
    375/240.12
2015/0195520 A1* 7/2015 Li ........................ H04N 19/119
    375/240.02
2016/0078282 A1* 3/2016 Lee .................... G06K 9/00268
    382/118

FOREIGN PATENT DOCUMENTS

| CN | 102364950 A | 2/2012 |
| --- | --- | --- |
| CN | 102724509 A | 10/2012 |
| CN | 102843559 A | 12/2012 |
| CN | 103297781 A | 9/2013 |
| CN | 103517069 A | 1/2014 |
| CN | 104125473 A | 10/2014 |
| WO | WO 2016/107468 A1 | 7/2016 |

OTHER PUBLICATIONS

PCT Search Report and Written Opinion issued in International Application No. PCT/CN2015/098261, dated Mar. 25, 2016 (12 pages).

First Chinese Search Report issued in Chinese Application No. 201410855651.9, dated May 9, 2018, (2 pages).

\* cited by examiner

RAPID SELECTION METHOD FOR VIDEO INTRA PREDICTION MODE AND APPARATUS THEREOF

CROSS REFERENCE TO RELATED APPLICATION

This application claims priority to International Application No. PCT/CN2015/098261, filed on Dec. 22, 2015, which claims priority to and the benefits of priority to Chinese Application No. CN 201410855651.9, filed Dec. 31, 2014, both of which are incorporated herein by reference in their entireties.

TECHNICAL FIELD

The present application relates to the field of video processing, and in particular to techniques for rapid selection of video intra prediction modes.

BACKGROUND

In order to make intra prediction more precise and reduce redundancy more effectively, 35 intra prediction modes are used in an HEVC (High Efficiency Video Coding) standard. When intra coding is performed, however, and if Rate-Distortion optimization (RDO) is successively conducted on the 35 intra prediction modes to determine an optimal prediction mode, an encoder would be unable to manage the computation for conducting RDO in all prediction directions, and thus the determination of the optimal prediction mode cannot be achieved. For this purpose, a "Rough-to-Fine" mode selection scheme is used in the HEVC. But, in such a scheme, the selection for the optimal intra prediction mode would still constitute the majority of workload in the entire coding process. Therefore, a method which can both ensure coding quality and improve the efficiency of intra prediction mode selection is desired.

SUMMARY

The objective of the present application is to provide methods and apparatuses for rapid selection of video intra prediction modes, so as to improve the calculation efficiency of intra prediction mode selection.

In order to solve the technical problem mentioned above, some embodiments of the present application disclose methods for rapid selection of video intra prediction modes, one method comprising the following steps:

acquiring a gradient amplitude and a gradient angle of each element in a prediction block;

analyzing statistics on the gradient angles and generating a gradient angle histogram of the prediction block;

if the texture smoothness of the prediction block is greater than a first pre-determined threshold value, determining that the prediction block is a first-type prediction block, and setting a prediction mode of the first-type prediction block to only comprise a direct current prediction mode and a planar prediction mode; and if the texture smoothness of the prediction block is less than a second pre-determined threshold value, determining that the prediction block is a second-type prediction block, and setting an angular prediction mode of the second-type prediction block to comprise an angular prediction mode corresponding to the maximum peak value in the gradient angle histogram, wherein the first pre-determined threshold value is greater than the second pre-determined threshold value.

Another embodiment of the present application further discloses a rapid selection apparatus for an video intra prediction mode, comprising:

an acquisition unit, configured to acquire a gradient amplitude and a gradient angle of each element in a prediction block;

a statistical unit, configured to analyze statistics on the gradient angles and generate a gradient angle histogram of the prediction block;

a first setting unit, configured to, when the texture smoothness of the prediction block is greater than a first pre-determined threshold value, determine that the prediction block is a first-type prediction block, and set a prediction mode of the first-type prediction block to only comprise a direct current prediction mode and a planar prediction mode; and a second setting unit, configured to, when the texture smoothness of the prediction block is less than a second pre-determined threshold value, determine that the prediction block is a second-type prediction block, and set an angular prediction mode of the second-type prediction block to comprise an angular prediction mode corresponding to the maximum peak value in the gradient angle histogram, wherein the first pre-determined threshold value is greater than the second pre-determined threshold value.

Compared with existing technology, the embodiments of the present application have the following main differences and effects:

based on texture contents and properties of prediction blocks, the prediction blocks are classified, and different numbers of prediction modes are set for prediction blocks of different types, which can effectively reduce the number of candidates on which RDO (the calculation of RDO is very complex and time-consuming) is conducted, thereby reducing the amount of calculation and improving the calculation efficiency.

Furthermore, with the decrease of the size of a prediction block, the statistical properties of the prediction block become weaker and are easy to be affected by factors such as noise. Therefore, self-adaptively adjusting the number of angular prediction modes for prediction blocks with different sizes, namely, selecting less angular prediction modes for a prediction block with a large size, and selecting a greater number of angular prediction modes for a prediction block with a small size, can improve the accuracy of determining prediction modes.

Furthermore, if the element is a pixel, gradient amplitudes and gradient angles of all the pixels may be calculated in advance, which can be for direct use by prediction blocks with different sizes in a subsequent prediction mode selection process. Compared with the calculation of various pixel parameters conducted after each transformation of the prediction block size, this can effectively avoid unnecessary repetitive calculation and significantly improve the calculation efficiency.

DETAILED DESCRIPTION

In the following description, to help readers better understand the present application, a number of technical details are proposed. However, those of ordinary skill in the art would understand that, regarding embodiments where some of these technical details are absent, and embodiments with a variety of variations and modifications based on the following, the technical solutions as claimed in the claims of the present application can also be implemented, without departing from the scope of the present invention.

In order to more clearly describe the objective, technical solutions and advantages of the present application, the following further describes some embodiments of the present application in detail in conjunction with the accompanying drawings.

Figure 1:
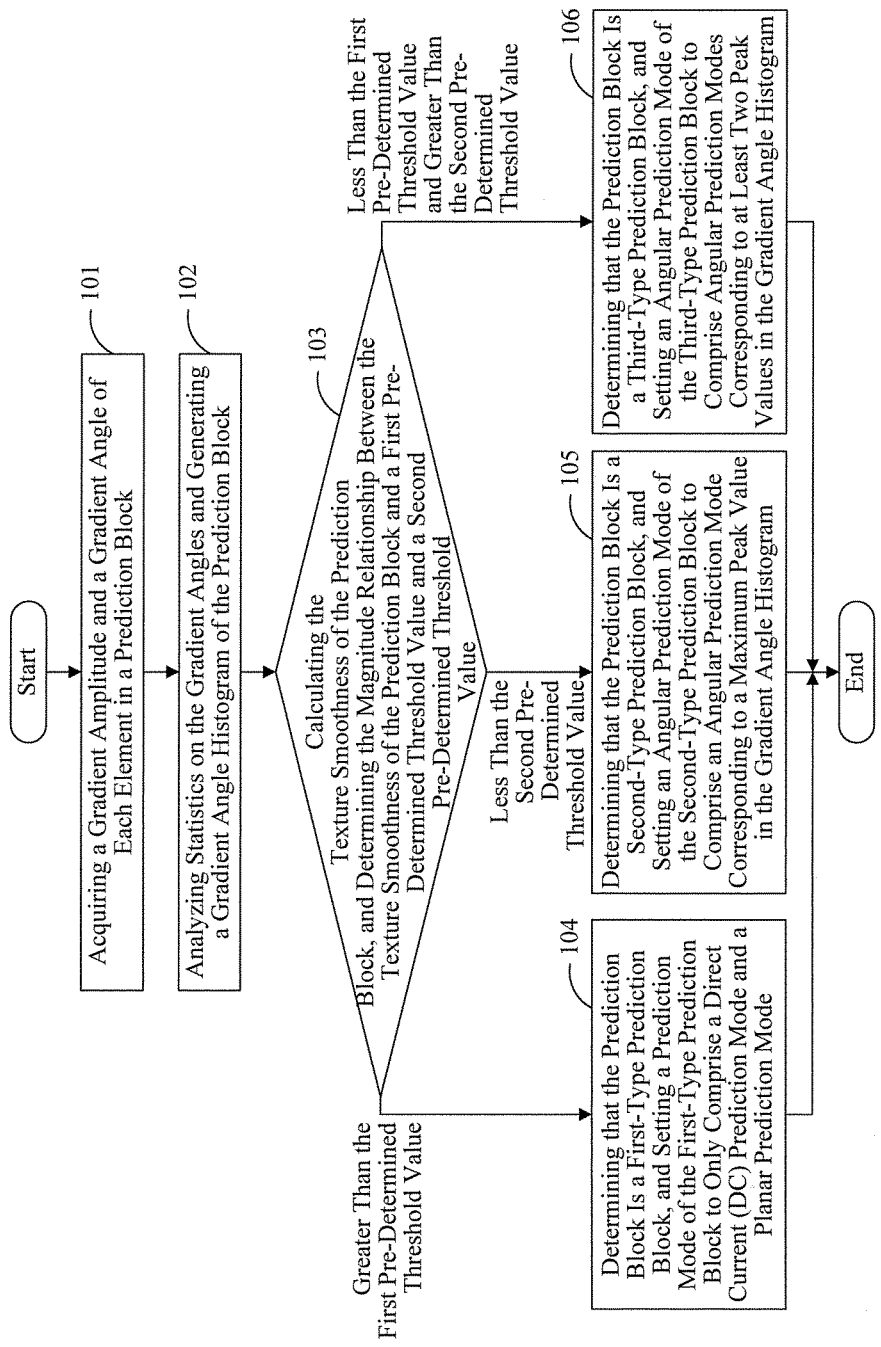
FIG. 1 is an exemplary schematic flow chart of a rapid selection method for video intra prediction modes, according to some embodiments of the present application.

FIG. 1 is an exemplary schematic flow chart of a rapid selection method for video intra prediction modes, according to some embodiments of the present application. Specifically, some embodiments of the present application relate to a rapid selection method for video intra prediction modes in HEVC. As shown in FIG. 1, the rapid selection method for video intra prediction modes comprises the following steps:

In step 101, a gradient amplitude and a gradient angle of each element in a prediction block are acquired, wherein an element of the prediction block can be a pixel and can also be a set of pixels of which the number is less than the total number of pixels of the prediction block. For example, with regard to a 32×32 prediction block, the element thereof can be a single pixel, and can also be a set of pixels with the size of 4×4, 2×2 or 8×8.

In step 102, statistics analysis is conducted on the gradient angles and a gradient angle histogram of the prediction block is generated.

In these embodiments, the horizontal coordinate in the gradient angle histogram can be a gradient angle of each element, and can also be a prediction angle of each element. The prediction angle of each element can refer to an angle closest to the gradient angle value thereof in 33 prediction angles, and an angular prediction mode corresponding to the prediction angle is also the most relevant angular prediction mode of the element. The vertical coordinate of the gradient angle histogram can be the number of pixels in a certain angular prediction mode or gradient angle, and can also be an accumulated value of gradient amplitudes of pixels in a certain angular prediction mode or gradient angle.

In step 103, the texture smoothness of the prediction block is calculated, and the magnitude relationship between the texture smoothness of the prediction block and a first pre-determined threshold value and a second pre-determined threshold value is determined. The first pre-determined threshold value can be greater than the second pre-determined threshold value.

The texture smoothness mentioned above represents the degree of gentleness of changes among interior elements of the prediction block, namely, the greater the texture smoothness, the less the texture of the prediction block, while the smaller the texture smoothness, the more the texture of the prediction block, and the stronger the texture directionality. In some embodiments of the present application, the texture smoothness of the prediction block can be determined based on the maximum gradient amplitude of gradient amplitudes of elements in the prediction block or the maximum peak value in the gradient angle histogram. In addition, it can be understood that in other embodiments of the present application, the texture smoothness can also be determined based on other factors, which is not limited herein.

If the texture smoothness of the prediction block is greater than the first pre-determined threshold value, then in step 104, the prediction block is determined to be a first-type prediction block, and a prediction mode of the first-type prediction block is set to only comprise a direct current (DC) prediction mode and a planar prediction mode. After step 104, the present process can end.

If the texture smoothness of the prediction block is less than the second pre-determined threshold value, then in step 105 the prediction block is determined to be a second-type prediction block, and an angular prediction mode of the second-type prediction block is set to comprise an angular prediction mode corresponding to the maximum peak value in the gradient angle histogram. After step 105, the present process can end.

And if the texture smoothness of the prediction block is greater than the second pre-determined threshold value and less than the first pre-determined threshold value, then in step 106, the prediction block is determined to be a third-type prediction block, and an angular prediction mode of the third-type prediction block is set to comprise angular prediction modes corresponding to at least two peak values in the gradient angle histogram. After step 106, the present process can end.

The aforementioned determines the angular prediction modes of the second-type prediction block and the third-type prediction block. According to the HEVC standard, the prediction modes of the second-type prediction block and the third-type prediction block comprise angular prediction modes and non-angular prediction modes, namely, in addition to the determined angular prediction modes mentioned above, the direct current prediction mode and the planar prediction mode are further included. Moreover, it is appreciated that, with regard to the first-type prediction block (e.g., a flat block), there can be little texture, and the changes among interior elements of the block are very gentle or there is almost no change, and the prediction effect can be achieved by only taking two non-angular prediction modes (e.g., DC and Planar) into consideration without calculating the angular prediction mode thereof, which can effectively reduce the amount of calculation. With regard to the second-type prediction block (e.g., a strong texture direction block), there can be very strong texture, and the direction of the texture is clear. Therefore, to reduce the amount of calculations, the prediction effect can be achieved by only fixing a small number of angular prediction modes.

To improve the prediction precision of the prediction block, the angular prediction mode of the second-type prediction block mentioned above may further comprise other angular prediction modes. In some embodiments, for example, the angular prediction modes of the second-type prediction block further comprises N angular prediction modes angularly adjacent to the angular prediction mode corresponding to the maximum peak value, wherein N is greater than or equal to 1.

In addition, in some embodiments of the present application, the composition of the angular prediction modes of the second-type prediction block mentioned above can be: a set containing the angular prediction mode corresponding to the maximum peak value in the gradient angle histogram, with angles corresponding to the angular prediction modes in the set being continuous. For example, if the angular prediction mode corresponding to the maximum peak value is 26, then angular prediction modes 26-29 are included in the set, or angular prediction modes 24-29 are included, or angular prediction modes 22-26 are included, etc.

With the decrease of the size of a prediction block, the statistical properties of the prediction block become weaker and are easy to be affected by factors such as noise. Therefore, self-adaptively adjusting the number of angular prediction modes for prediction blocks with different sizes, namely, selecting less angular prediction modes for a prediction block with a large size, and selecting a greater number of angular prediction modes for a prediction block with a small size, can improve the accuracy of determining a prediction mode. Therefore, in some embodiments of the present application, the larger the size of the second-type prediction block or the third-type prediction block mentioned above, the less the number of the angular prediction modes thereof. For example, in step 106, the larger the size of the third-type prediction block, the less the number of the angular prediction modes. In practical applications, the peak values in the gradient angle histogram can be sorted in a descending order, and according to the size of the prediction block, angular prediction modes corresponding to the first M peak values are taken as the angular prediction modes of the prediction block.

In other embodiments of the present application, the number of peak values can also be determined according to other methods. For example, the angular prediction mode of the third-type prediction block can be determined by acquiring an angular prediction mode corresponding to a peak value that is greater than a certain peak value threshold value, and the larger the size of the prediction block, the greater the peak value threshold value. Thus, with regard to a prediction block with a large size, the number of angular prediction modes thereof is still less than that of a prediction block with a small size.

Based on texture contents and properties of the prediction blocks, the prediction blocks are classified, and different numbers of prediction modes are set for prediction blocks of different types, which can effectively reduce the number of candidates on which RDO (the calculation of RDO is very complex and time-consuming) is conducted, thereby reducing the amount of calculation and improving the calculation efficiency.

Figure 2:
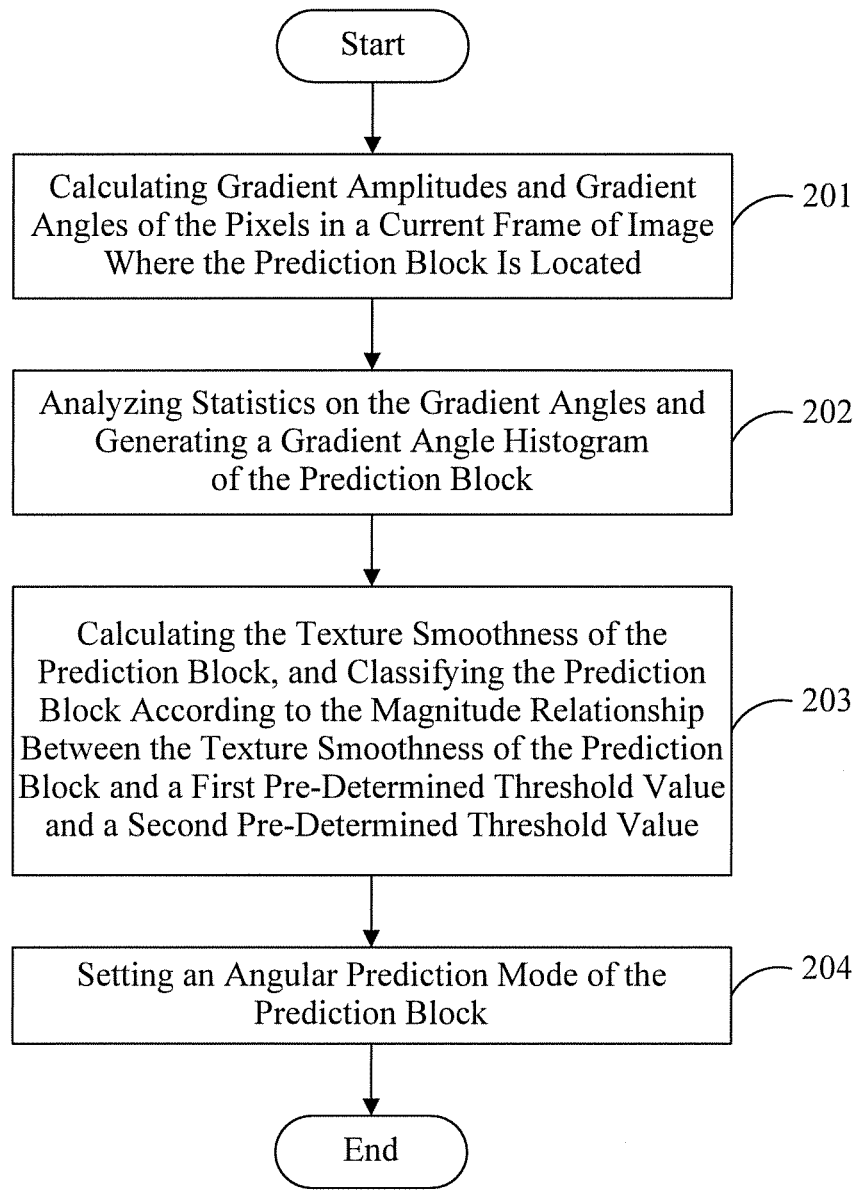
FIG. 2 is an exemplary schematic flow chart of a rapid selection method for video intra prediction modes, according to some embodiments of the present application.

FIG. 2 is an exemplary schematic flow chart of a rapid selection method for video intra prediction modes, according to some embodiments of the present application. The embodiments associated with FIG. 2 make improvements on the basis of the embodiments described above with reference to FIG. 1. These improvements include the elements in the prediction block are pixels, and gradient amplitudes and gradient angles of all the pixels are calculated in advance, which can be for direct use by prediction blocks with different sizes in a subsequent prediction mode selection process. Compared with the calculation of various pixel parameters conducted after each transformation of the prediction block size, this can effectively avoid unnecessary repetitive calculation and significantly improve the calculation efficiency.

Specifically, the elements in the prediction block mentioned above are pixels. As shown in FIG. 2, this rapid selection method for an video intra prediction mode comprises the following steps:

In step 201, gradient amplitudes and gradient angles of the pixels in a current frame of image where the prediction block is located are calculated. For example, in one practical application of the present application, the calculation process for the gradient amplitude and gradient angle of each pixel in the current frame of image is as follows:

a) a gradient of each pixel is calculated: Grad(x, y)={dx, dy}, where $$dx=-p(x-1,y-1)+p(x-1,y+1)-2*p(x,y-1)+2*p(x,y+1)-p(x+1,y-1)+p(x+1,y+1);$$

$$dy=p(x-1,y-1)+2*p(x-1,y)+p(x-1,y+1)-p(x+1,y-1)-2*p(x+1,y)-p(x+1,y+1).$$

Or:

$$dx=-p(x-1,y-1)+p(x-1,y+1)-p(x,y-1)+p(x,y+1)-p(x+1,y-1)+p(x+1,y+1);$$

$$dy=p(x-1,y-1)+p(x-1,y)+p(x-1,y+1)-p(x+1,y-1)-p(x+1,y)-p(x+1,y+1).$$

Or:

$$dx=-p(x-1,y-1)+p(x-1,y)-p(x,y-1)+p(x,y);$$

$$dy=p(x-1,y-1)+p(x-1,y)-p(x+1,y-1)-p(x+1,y),$$

where p(x, y) is a pixel value of a current pixel point;

b) a gradient amplitude GradAmp=abs(dx)+abs(dy) (abs represents taking the absolute value); and c) a gradient angle GradAng=arctan(dy/dx) or GradAng=dy/dx.

Then step 202 is entered, where statistics analysis is conducted on the gradient angles and a gradient angle histogram of the prediction block is generated. In the gradient angle histogram of this embodiment, the horizontal coordinate is the prediction mode (33 angular prediction modes+DC prediction mode+Planar prediction mode), and the vertical coordinate is an accumulated value of gradient amplitudes of all the pixels in each prediction mode. The specific generation process of the histogram is as follows:

a) the most relevant angular prediction mode of each pixel is calculated.

Figure 3:
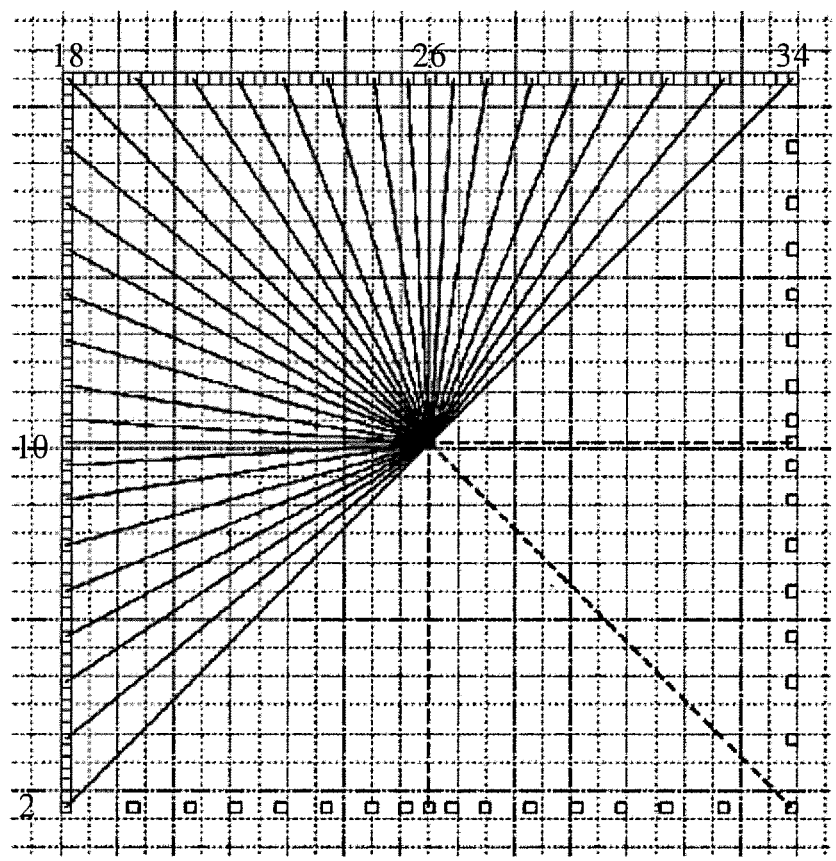
FIG. 3 is an exemplary schematic diagram of angles of 33 angular prediction modes of the HEVC in the prior art.

FIG. 3 is an exemplary schematic diagram of angles of 33 angular prediction modes of the HEVC in the prior art, namely, 33 angular prediction modes or directions (2, 3, 4, . . . , 10, . . . , 34) of the HEVC. It is represented in a table as follows (only changes in sequence, which is used for simplifying calculation):

mode33=[18,19,20,21,22,23,24,25,26,27,28,29,30,31, 32,33,34, . . . 17,16,15,14,13,12,11,10,9,8,7,6,5, 4,3,2];

Corresponding to the 33 angular prediction modes or directions, gradient angles corresponding thereto can be calculated in advance, as shown in the following table:

GradAng33=[−1.000000,−1.230769,−1.523810,− 1.882353,−2.461538,−3.555556,−6.400000,− 16.000000,9999,16.000000,6.400000,3.555556, 2.461538,1.882353,1.523810,1.230769, 1.000000,−0.812500,−0.656250,−0.531250,− 0.406250,−0.281250,−0.156250,−0.062500, 0.000000,0.062500,0.156250,0.281250, 0.406250,0.531250,0.656250,0.812500, 1.000000];

GradAng33 is the GradAng value (dy/dx) corresponding to the 33 angular prediction modes.

With regard to each pixel input by an image, the value of dy/dx is obtained according to the above calculation, and the gradient angle GradAng=arctan(dy/dx) or GradAng=dy/dx. Then the closest value is looked up in the GradAng33 table. For example, if we find that the $i^{th}$ value is the closest, and the $i^{th}$ value in GradAng33 corresponds to the $i^{th}$ value in the mode33 table, then the $i^{th}$ value in the mode33 table is the most relevant angular prediction mode of the pixel; and so far the most relevant angular prediction mode of each pixel is obtained.

Here, if the maximum gradient amplitude of the prediction block is to be used subsequently, then the maximum gradient amplitude in each prediction block can be calculated, for example, the gradient amplitude with the greatest value can be selected from gradient amplitudes of pixels included in the prediction block.

b) a gradient angle histogram of the prediction block is generated.

Figure 4:
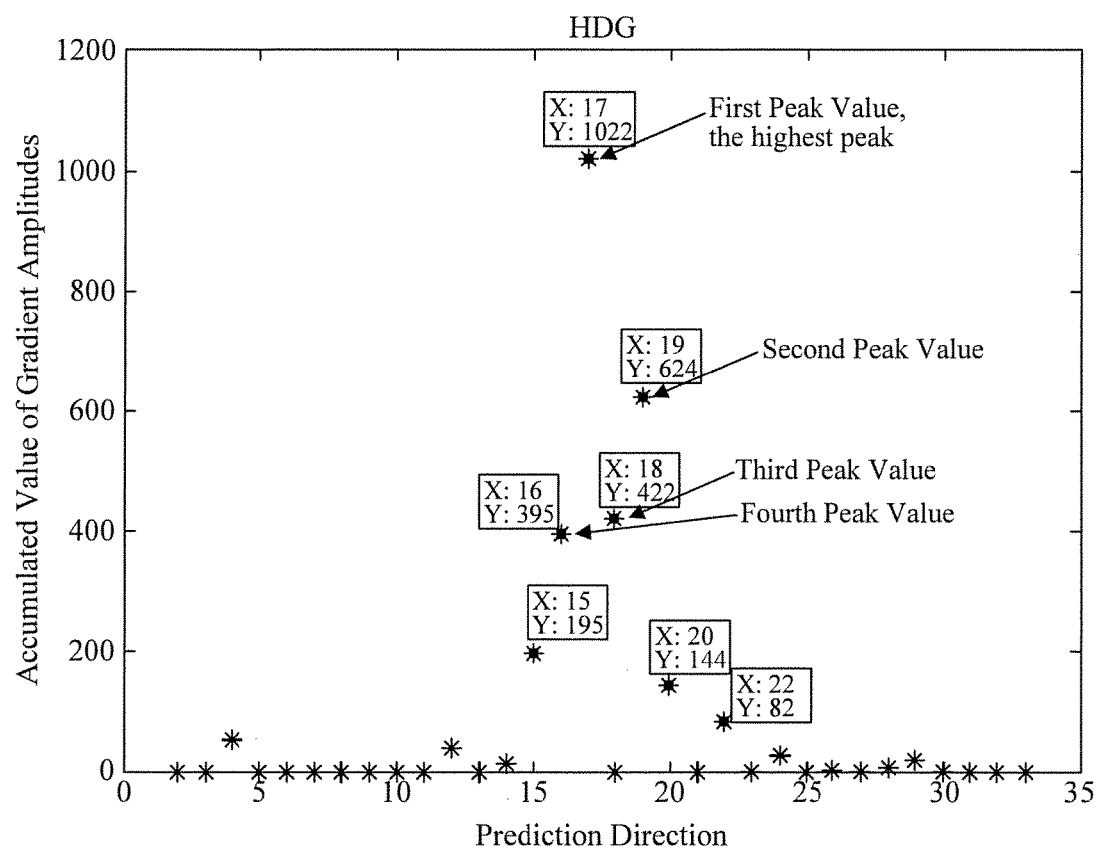
FIG. 4 is an exemplary gradient angle histogram of a prediction block, according to some embodiments of the present application.
Figure 5:
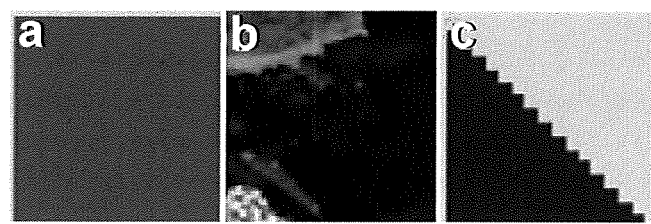
FIG. 5 is an exemplary schematic diagram of images of three prediction blocks, according to some embodiments of the present application.

In some embodiments, with regard to a certain angular prediction mode, gradient amplitude values of all the pixels, of which the most relevant angular prediction mode is this angular prediction mode, are accumulated and a histogram of the angular prediction mode is obtained. Then with regard to all the angular prediction modes (33 angular prediction modes), angular prediction mode histograms thereof are obtained, and at last a total gradient angle histogram (as shown in FIG. 4) is obtained. In the gradient angle histogram, the horizontal coordinate 2, 3, . . . 34 represent 33 angular prediction modes (the prediction angles thereof correspond to gradient angles). The vertical coordinate is an accumulated value of gradient amplitudes in a corresponding angular prediction mode. In the gradient angle histogram, whether it is a peak value or which peak value it is can be determined according to a vertical coordinate value, that is, the accumulated value of the gradient amplitudes thereof. For example, the accumulated value 1022 of gradient amplitudes of a first peak value (e.g., the maximum peak value) indicates a prediction mode (that is, a prediction angle direction) 17; the accumulated value 624 of gradient amplitudes of a second peak value indicates a prediction mode (that is, a prediction angle direction) 19; the accumulated value 422 of gradient amplitudes of a third peak value indicates a prediction mode (that is, a prediction angle direction) 18; and the accumulated value 395 of gradient amplitudes of a fourth peak value indicates a prediction mode (that is, a prediction angle direction) 16.

Referring back to FIG. 2, in step 203, the texture smoothness of the prediction block is calculated, and the prediction block is classified according to the magnitude relationship between the texture smoothness of the prediction block and a first pre-determined threshold value and a second pre-determined threshold value. One specific implementation process embodiment of the present application is as follows:

a) whether the prediction block is the first-type prediction block (e.g., a smooth and flat block) or a non-first-type prediction block (e.g., a non-smooth or non-flat block) is first determined. This can be determined depending on a determination condition that whether a texture gradient of the prediction block is very small (i.e. whether the texture smoothness is very great). If the condition is satisfied, then it is a smooth and flat block; otherwise, it is not a smooth and flat block. The determination condition that whether a texture gradient is very small can be measured by the following feature:

the maximum amplitude of pixels in the prediction block is less than Th_GradAmp, or the maximum peak value of the gradient angle histogram of the prediction block is less than Th_Peak, wherein Th_GradAmp and Th_Peak are set threshold values. Here, the smaller the maximum amplitude of pixels in the prediction block or the maximum peak value in the gradient angle histogram, the greater the texture smoothness.

The maximum gradient amplitude of the prediction block and the maximum peak value of the gradient direction histogram of the prediction block have already been obtained through calculation previously.

b) If the prediction block is a non-first-type prediction block, then whether it belongs to the second-type prediction block (e.g., a strong texture direction block) or the third-type prediction block (e.g., a general block) is determined. Specifically, this can be determined depending on whether the maximum peak value of the gradient angle histogram of the prediction block is dominant: if the maximum peak value in the gradient angle histogram of the prediction block is dominant, then it is a strong texture direction block; otherwise, it is a general block. Whether the maximum peak value of the gradient angle histogram of the prediction block is dominant can be measured by the following:

the maximum peak value in the gradient angle histogram is greater than k* (the second greatest peak value of the gradient angle histogram+the third greatest peak value of the gradient angle histogram), or the maximum peak value of the gradient angle histogram is greater than Th_percent total energy of the gradient angle histogram.

In the determination condition mentioned above, k is a parameter, such as 0.9; and Th_percent is a set threshold value, such as 60%.

Pre-classification for the prediction block is accomplished so far. As shown in FIG. 5, FIGS. 5a-c respectively represent a flat block (the first-type prediction block), a general block (the third-type prediction block), and a strong texture direction block (the second-type prediction block).

Referring back to FIG. 2, in step 204, an angular prediction mode of the prediction block is set.

If the prediction block is the first-type prediction block, then the prediction mode of the prediction block is set to comprise two non-angular prediction modes, namely, a DC prediction mode and a Planar prediction mode. In some embodiments, the prediction mode can be set to only comprise the two non-angular prediction modes.

If the prediction block is the second-type prediction block, then the prediction mode of the prediction block is set to comprise three angular prediction modes (an angular prediction mode corresponding to the maximum peak value in the gradient angle histogram, and two angular prediction modes angularly adjacent to the angular prediction mode), and two non-angular prediction modes (the DC prediction mode and the Planar prediction mode).

If the prediction block is the third-type prediction block, then the prediction modes of the prediction block is set to comprise M angular prediction modes and two non-angular prediction modes (the DC prediction mode and the Planar prediction mode). The M angular prediction modes are angular prediction modes corresponding to the M maximum peak values in the gradient angle histogram of the prediction block, where M varies with different prediction block sizes. For instance, the larger the size of the prediction block, the smaller the M, and the smaller the size of the prediction block, the greater the M. For example, with regard to a 64×64 prediction block, M is 2; with regard to a 32×32 prediction block, M is 2; with regard to a 16×16 prediction block, M is 4; with regard to an 8×8 prediction block, M is 6; and with regard to a 4×4 prediction block, M is 8.

The present process is ended hereafter.

The advantage of pre-classification for the prediction block is as follows: the number of candidates, on which subsequent RDO calculation is conducted, with regard to certain specific blocks (a smooth and flat block and a strong texture direction block) can be reduced, thereby reducing the amount of calculation. For example, with regard to a 16×16 prediction block, if the most primitive method is used, then RDO calculation can be conducted on the complete 35 (33 angular+2 non-angular: DC and Planar) candidate prediction modes. If an approximate direction (e.g., an optimal prediction mode) is determined based on the gradient direction histogram of an image block, then exhaustion of the 33 angles is not needed. And with regard to a general block, the RDO calculation only needs to be conducted on four angular prediction modes and two other non-angular prediction modes (DC and Planar). With regard to a flat block, the RDO calculation only needs to be conducted on two non-angular prediction modes (DC and Planar). With regard to a strong texture direction block, the RDO calculation only needs to be conducted on three angular prediction modes and two non-angular prediction modes. In general, the number of modes on which RDO calculation is conducted can be effectively reduced.

Various method embodiments of the present application can all be implemented in the form of software, hardware or firmware. No matter whether the present application is implemented in the form of software, hardware or firmware, instruction codes can all be stored in any type of computer accessible memory (such as permanent or modifiable, volatile or non-volatile, solid state or non-solid state, fixed or removable media). Likewise, the memory may be, for example, a Programmable Array Logic ("PAL" for short), a Random Access Memory ("RAM" for short), a Programmable Read Only Memory ("PROM" for short), a Read-Only Memory ("ROM" for short), an Electrically Erasable Programmable ROM ("EEPROM" for short), a magnetic disk, an optical disc, a Digital Versatile Disc ("DVD" for short), flash memory, a register, a cache, and the like.

Figure 6:
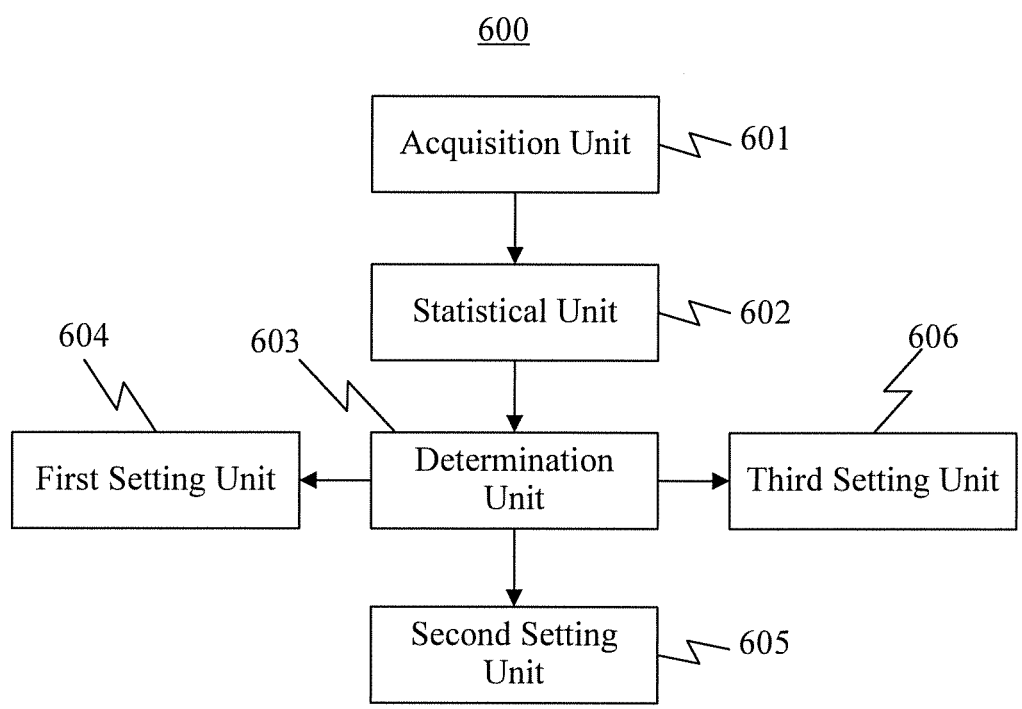
FIG. 6 is an exemplary schematic structural diagram of a rapid selection apparatus for video intra prediction modes, according to some embodiments of the present application.

FIG. 6 is an exemplary schematic structural diagram of a rapid selection apparatus for video intra prediction modes, according to some embodiments of the present application.

Specifically, as shown in FIG. 6, the rapid selection apparatus 600 for an intra prediction mode in video comprises:

an acquisition unit 601 configured to acquire a gradient amplitude and a gradient angle of each element in a prediction block;

a statistical unit 602 configured to conduct statistics analysis on the gradient angles and generate a gradient angle histogram of the prediction block;

a determination unit 603 configured to calculate the texture smoothness of the prediction block, and determine the magnitude relationship between the texture smoothness of the prediction block and a first pre-determined threshold value and a second pre-determined threshold value, wherein the first pre-determined threshold value is greater than the second pre-determined threshold value;

a first setting unit 604 configured to, when the texture smoothness of the prediction block is greater than a first pre-determined threshold value, determine that the prediction block is a first-type prediction block, and set a prediction mode of the first-type prediction block to only comprise a direct current prediction mode and a planar prediction mode;

a second setting unit 605 configured to, when the texture smoothness of the prediction block is less than a second pre-determined threshold value, determine that the prediction block is a second-type prediction block, and set an angular prediction mode of the second-type prediction block to comprise an angular prediction mode corresponding to the maximum peak value in the gradient angle histogram; and a third setting unit 606 configured to, when the texture smoothness of the prediction block is greater than the second pre-determined threshold value and less than the first pre-determined threshold value, determine that the prediction block is a third-type prediction block, and set an angular prediction modes of the third-type prediction block to comprise angular prediction modes corresponding to at least two peak values in the gradient angle histogram.

To improve the prediction precision of the prediction block, the angular prediction mode of the second-type prediction block mentioned above can further comprise other angular prediction modes. For example, in some embodiments of the present application, when setting an angular prediction mode of the second-type prediction block, the second setting unit 605 mentioned above can further set the angular prediction mode of the second-type prediction block to further comprise N angular prediction modes angularly adjacent to the angular prediction mode corresponding to the maximum peak value, wherein N is greater than or equal to 1.

With the decrease of the size of a prediction block, the statistical properties of the prediction block become weaker and are easy to be affected by factors such as noise. Therefore, self-adaptively adjusting the number of angular prediction modes for prediction blocks with different sizes, namely, selecting less angular prediction modes for a prediction block with a large size, and selecting a greater number of angular prediction modes for a prediction block with a small size, can improve the accuracy of determining a prediction mode. Therefore, in some embodiments, when the third setting unit 606 sets an angular prediction mode of the third-type prediction block, the larger the size of the third-type prediction block, the less the number of the angular prediction modes thereof.

The embodiments associated with FIG. 1 can correspond with and can be in mutual cooperation with these embodiments of FIG. 6. The relevant technical details referred to in the embodiments associated with FIG. 1 are still effective in these embodiments, and in order to reduce repetition, these details will not be described again. Correspondingly, the relevant technical details referred to in the embodiments associated with FIG. 6 may also be applied to the embodiments associated with FIG. 1.

In some embodiments, the apparatus of FIG. 6 can have further improvements that help avoid unnecessary repetitive calculation and significantly improve the calculation efficiency. For example, the elements in the prediction block are pixels, and gradient amplitudes and gradient angles of all pixels can be calculated in advance. These calculated values can be for direct use by prediction blocks with different sizes in a subsequent prediction mode selection process. This may significantly improve the calculation efficiency, compared with the calculation of various pixel parameters conducted after each transformation of the prediction block size.

Specifically, the elements in the prediction block mentioned above are pixels, and the rapid selection apparatus for video intra prediction modes further comprises the following unit:

a calculation unit, configured to calculate gradient amplitudes and gradient angles of all the pixels in a current frame of image where the prediction block is located.

These embodiments can correspond with and be implemented in combination with the embodiments corresponding to FIG. 2, as the relevant technical details referred to in the embodiments of FIG. 2 are still effective in these embodiments.

It should be appreciated that various units referred to in various device embodiments of the present application are all logical units. Physically, one logical unit may be one physical unit and may also be a part of one physical unit, and may further be implemented in a combination of a plurality of physical units. The physical implementation methods of these logical units are not limited by the disclosed embodiments herein, various combinations of the functions implemented by these logical units may be used to solve the technical problem proposed in the present application, without departing from the scope of the present invention. In addition, in order to highlight the inventive parts of the present application, the various device embodiments of the present application mentioned above do not introduce units which are not so closely related to solving the technical problem proposed in the present application, but this does not indicate that there are no other units in the device embodiments mentioned above.

In general, the word "unit," as used herein, can be a packaged functional hardware unit designed for use with other components (e.g., portions of an integrated circuit) or a part of a program (stored on a computer readable medium) that performs a particular function of related functions. The unit can have entry and exit points and can be written in a programming language, such as, for example, Java, Lua, C or C++. A software unit or module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other non-transitory medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedding in firmware, such as an EPROM. It will be further appreciated that hardware units can be comprised of connected logic units, such as gates and flip-flops, and/or can be comprised of programmable units, such as programmable gate arrays or processors. Generally, the units described herein refer to logical units that can be combined with other units or divided into sub-units despite their physical organization or storage.

It should be appreciated that in the claims and description of the present patent application, the relational terms here such as first and second are only used to differentiate an entity or operation from another entity or operation, and do not require or imply any such actual relationship or sequence between these entities or operations. Moreover, the terms "include", "comprise", or their any other variants are intended to cover a non-exclusive inclusion. Therefore, a process, method, article, or device which includes not only including those listed elements but also other elements not expressly listed, or further includes inherent elements of such process, method, article, or device, are all encompassed within the scope of the present invention. If no more limitations are made, an element limited by "comprising a/an" does not exclude other similar elements existing in the process, method, article, or device which includes the element.

Although the present application has been illustrated and described with reference to some preferred embodiments of the present application, those of ordinary skill in the art should understand that various changes in form and in details can be made to the present application without departing from the spirit and scope thereof.

What is claimed is:

1. A rapid selection method for an intra prediction mode, the method comprising:
   acquiring a gradient amplitude and a gradient angle of each element in a prediction block;
   analyzing statistics on the gradient angles and generating a gradient angle histogram of the prediction block;
   determining, based on the analysis, texture smoothness of the prediction block;
   in response to a determination that the texture smoothness of the prediction block is greater than a first pre-determined threshold value:
      setting a prediction mode of the prediction block to comprise a direct current prediction mode and a planar prediction mode; and
   in response to a determination that the texture smoothness of the prediction block is less than a second pre-determined threshold value:
      setting an angular prediction mode of the prediction block to comprise an angular prediction mode corresponding to a maximum peak value in the gradient angle histogram,
   wherein the first pre-determined threshold value is greater than the second pre-determined threshold value.

2. The rapid selection method for an intra prediction mode according to claim 1, wherein the angular prediction mode further comprises N angular prediction modes angularly adjacent to the angular prediction mode corresponding to the maximum peak value, wherein N is greater than or equal to 1.

3. The rapid selection method for an intra prediction mode according to claim 1, further comprising:
   in response to a determination that the texture smoothness of the prediction block is greater than the second pre-determined threshold value and less than the first pre-determined threshold value:
      setting an angular prediction mode of the prediction block to comprise angular prediction modes corresponding to at least two peak values in the gradient angle histogram.

4. The rapid selection method for an intra prediction mode according to claim 3, wherein a size of the prediction block affects a number of angular prediction modes.

5. The rapid selection method for an intra prediction mode according to claim 1, wherein the texture smoothness of the prediction block is determined based on a maximum gradient amplitude of gradient amplitudes of elements in the prediction block, or the maximum peak value in the gradient angle histogram.

6. The rapid selection method for an intra prediction mode according to claim 1, wherein the element is a pixel, and the rapid selection method further comprising:
calculating gradient amplitudes and gradient angles of pixels in a current frame of image where the prediction block is located.

7. A non-transitory computer readable medium that stores a set of instructions that is executable by at least one processor of an intra prediction mode selection device to cause the intra prediction mode selection device to perform a method for intra prediction mode selection, the method comprising:
acquiring a gradient amplitude and a gradient angle of each element in a prediction block;
analyzing statistics on the gradient angles and generating a gradient angle histogram of the prediction block;
determining, based on the analysis, texture smoothness of the prediction block;
in response to a determination that the texture smoothness of the prediction block is greater than a first pre-determined threshold value:
setting a prediction mode of the prediction block to comprise a direct current prediction mode and a planar prediction mode; and
in response to a determination that the texture smoothness of the prediction block is less than a second pre-determined threshold value:
setting an angular prediction mode of the prediction block to comprise an angular prediction mode corresponding to a maximum peak value in the gradient angle histogram,
wherein the first pre-determined threshold value is greater than the second pre-determined threshold value.

8. The non-transitory computer readable medium according to claim 7,
wherein the angular prediction mode further comprises N angular prediction modes angularly adjacent to the angular prediction mode corresponding to the maximum peak value, wherein N is greater than or equal to 1.

9. The non-transitory computer readable medium according to claim 7, wherein the set of instructions that is executable by the at least one processor of the intra prediction mode selection device to cause the intra prediction mode selection device to further perform:
in response to a determination that the texture smoothness of the prediction block is greater than the second pre-determined threshold value and less than the first pre-determined threshold value:
setting an angular prediction mode of the prediction block to comprise angular prediction modes corresponding to at least two peak values in the gradient angle histogram.

10. The non-transitory computer readable medium according to claim 9, wherein a size of the prediction block affects a number of angular prediction modes.

11. The non-transitory computer readable medium according to claim 7, wherein the texture smoothness of the prediction block is determined based on a maximum gradient amplitude of gradient amplitudes of elements in the prediction block, or the maximum peak value in the gradient angle histogram.

12. The non-transitory computer readable medium according to claim 7, wherein the element is a pixel, and the set of instructions that is executable by the at least one processor of the intra prediction mode selection device to cause the intra prediction mode selection device to further perform:
calculating gradient amplitudes and gradient angles of pixels in a current frame of image where the prediction block is located.

13. An apparatus for intra prediction mode selection, comprising:
a memory storing instructions; and
a processor configured to execute the instructions to cause the apparatus to:
acquire a gradient amplitude and a gradient angle of each element in a prediction block;
analyze statistics on the gradient angles and generating a gradient angle histogram of the prediction block;
determine, based on the analysis, texture smoothness of the prediction block;
in response to a determination that the texture smoothness of the prediction block is greater than a first pre-determined threshold value:
set a prediction mode of the prediction block to comprise a direct current prediction mode and a planar prediction mode; and
in response to a determination that the texture smoothness of the prediction block is less than a second pre-determined threshold value:
set an angular prediction mode of the prediction block to comprise an angular prediction mode corresponding to a maximum peak value in the gradient angle histogram,
wherein the first pre-determined threshold value is greater than the second pre-determined threshold value.

14. The apparatus according to claim 13,
wherein the angular prediction mode further comprises N angular prediction modes angularly adjacent to the angular prediction mode corresponding to the maximum peak value, wherein N is greater than or equal to 1.

15. The apparatus according to claim 13, wherein the processor is further configured to cause the apparatus to:
in response to a determination that the texture smoothness of the prediction block is greater than the second pre-determined threshold value and less than the first pre-determined threshold value:
set an angular prediction mode of the prediction block to comprise angular prediction modes corresponding to at least two peak values in the gradient angle histogram.

16. The apparatus according to claim 15, wherein a size of the prediction block affects a number of angular prediction modes.

17. The apparatus according to claim 13, wherein the texture smoothness of the prediction block is determined based on a maximum gradient amplitude of gradient amplitudes of elements in the prediction block, or the maximum peak value in the gradient angle histogram.

18. The apparatus according to claim 13, wherein the element is a pixel, and the processor is further configured to cause the apparatus to:
calculate gradient amplitudes and gradient angles of pixels in a current frame of image where the prediction block is located.

* * * * *